May 7, 1935. W. M. ZAIKOWSKY 2,000,552
STOP COCK
Filed Dec. 26, 1930

Inventor
Wladimir M. Zaikowsky
by John Flam
Attorney

Patented May 7, 1935

2,000,552

UNITED STATES PATENT OFFICE 2,000,552

STOP-COCK

Wladimir M. Zaikowsky, Pasadena, Calif.

Application December 26, 1930, Serial No. 504,790

3 Claims. (Cl. 251—109)

This invention relates to stop-cocks, and more particularly to improvements in the construction of the three way stop-cocks.

The use of stop-cocks for permitting the predetermined flow of fluids through an orifice is quite well-known, and are used in many apparatus. Universal application of these stop-cocks is found particularly in gas analysis apparatus such as the Orsatt or Hempel. However, the known stop-cocks are open to many objections, which render their use in gas analysis apparatus objectionable due to their construction. Such stop-cocks do not lend themselves very readily to insure accurate results. It is therefore an object of this invention to provide a stop-cock which obviates the objection of the prior art and permits an increase in accuracy when used in gas analysis apparatus.

It is now the common practice to make stop-cocks with the hole drilled through the center of the stopper along a line normal to the longitudinal axis thereof. Such practice, when applied to the three-way T-shaped stop-cocks, requires the use of an additional hole or bore normal to the central bore. By means of this stop-cock, communication between any two ends of the bores or all the ends simultaneously, may be had.

This simultaneous communication between all the ends of the bores, can also be had by means of V-shaped bores in the stopper. In both of these stop-cocks of the prior art, the shape of the bores through the stopper forms pockets which entrap small quantities of gas which ordinarily should have been returned to the measuring burette. It is accordingly obvious that the gas in the measuring burette does not indicate the accurate quantity in the apparatus. Moreover, in these stop-cocks of the prior art, no external indicating means are available for indicating which particular bore is in communication with the measuring burette.

I have found that a three way connection is possible in a T-joint by utilizing a single straight bore in the stopper, having an external means for indicating the direction thereof. I accomplish this by providing a single hole bored through the barrel and the stopper along the chord of a 120° arc and having the handle to the stopper similarly offset and parallel to this hole. In this manner all pockets at the arms for entrapping fluids in the bends are eliminated, and the position of the handle indicates the position of the hole or connection. It is therefore another object of this invention to provide a stop-cock having arms forming a straight uninterrupted bore through the barrel and stopper, and provided with a handle which indicates the position of the bore.

It is a further object of this invention to provide a straight, pocketless, uninterrupted bore through the stopper of a T stop-cock along the chord of a 120° arc.

In a gas analysis apparatus, the stop-cock snugly fits into a barrel or bore of a T-shaped manifold. One of the upper arms of the T leads to a measuring burette (not shown) containing a measured quantity of gas; the other end leads to a vessel confining a liquid (usually mercury); and the leg of the T leads to a pipette containing an absorbing agent. The gas is circulated back and forth from the measuring burette to the pipette until all of a definite element or elements is absorbed by the absorbing agent. This constant circulation of the gas through the absorbing agent causes a foam to form in the leg of the T which prevents the complete return of the gas, minus the absorbed element, to the measuring burette; and the gas flowing out of the pipette has a tendency to carry along with it the little droplets or pistons of reagent. Accordingly, the measuring burette would not accurately indicate the volume of gas absorbed by the absorbing reagent.

This formation of a foam and the carrying of the droplets into the measuring burette by the gas, can be eliminated by providing a bulbous portion in the leg of the T which breaks up the droplets or emulsion of reagent in the gas and insures the complete return of the unabsorbed gas to the measuring burette. It is therefore a further object of this invention to provide my stop-cock with a bulbous portion in the leg of a T-shaped manifold which breaks up the droplets or pistons of reagent and prevents their being carried with the gas into the measuring burette.

My invention possesses many other advantages, and has other objects which may be made more easily apparent from a consideration of several embodiments of my invention. For this purpose I have shown a few forms in the drawing accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Referring to the drawing.

Figure 1:
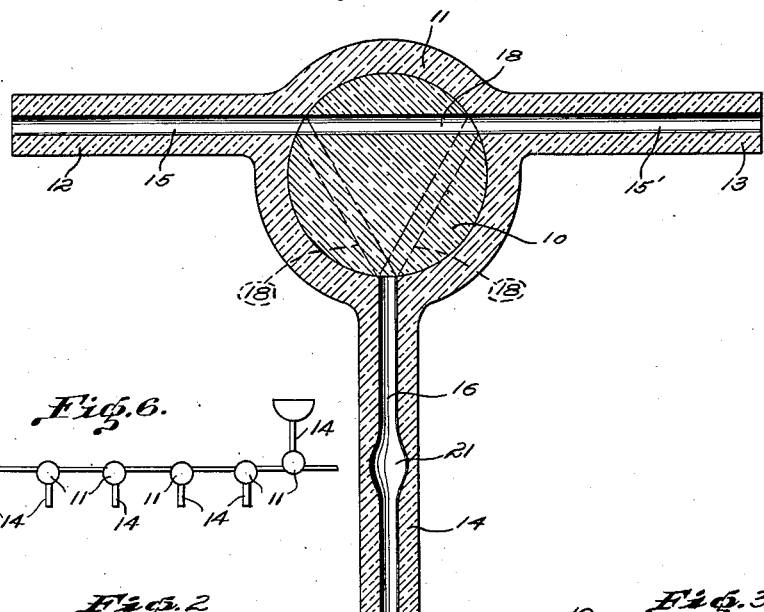
Figure 1 is an enlarged sectional view of a portion of a gas analysis manifold including my novel stop-cock.

In order to more fully set forth the novel elements of my stop-cock, it will be described in conjunction with a portion of a manifold or a gas analysis apparatus. However, it is to be understood that this invention is not to be construed as limited to the specific use to be described, but is intended to include all stop-cocks having the same or similar characteristics.

The stopper 10 is shown as a being snugly fitted for rotation in the core or barrel 11 of a gas analysis manifold. This manifold is of T-shape, and comprises an arm 12 leading to a measuring burette (not shown); an arm 13 leading to a vessel (not shown) containing a liquid such as mercury; and a leg 14 leading to a pipette (not shown) containing an absorbing reagent. There can be as many legs 14 as desired which lead to absorbing pipettes, although in actual practice there are three pipettes containing absorbant reagents such as sodium or potassium hydroxide, fuming sulphuric acid, and pyrogallic acid for absorbing carbon dioxide, illuminates, and oxygen respectively from the gas within the measuring burette.

The arms 12 and 13, are provided with bores or passageways 15, 15' respectively, which intersect the barrel 11 at the extremities of and along a chord of an arc of 120°. The leg 14 is provided with a bore 16 which establishes communication between the pipette and the barrel 11. This bore is in the same plane as bores 15—15', and is perpendicular to them. Communication between the bores 15, 15' and 16 is normally interrupted by the base or stopper 17 of the stop-cock 10. Stopper 17 is of conventional cylindrical form, tapering slightly towards the free end.

In order to establish communication between the respective bores, such as 15, 15'; 15, 16; or 15', 16; a straight single uninterrupted bore 18 is formed in the stopper 17. This bore is drilled through the stopper 17 along the chord of an arc of 120°. In this manner a three way joint is provided which permits communication between any two respective bores in the manifold without the formation of pockets which would entrap gas. Since bore 18 and arms 12 and 13 are not characterized by crooks or bends, there are no pockets in the stopper which are not flushed completely by the confining liquid, and accordingly several of these stoppers can be inserted in the arms of the manifold without impairing the accuracy of the measurements. This is due to the elimination of traps for the gas as is the case with the stop-cocks of the prior art.

The stopper 17 can be turned in barrel 11 to establish communication between any two bores in the manifold as by a handle 19. This handle is formed integral with a neck 20 of the stopper 17, and is positioned parallel to and above the bore 18 and accordingly indicates between which bores of the manifold communication is permitted. This feature is of prime importance as it eliminates the possibility of directing gas or reagents to a place other than intended.

An enlarged bulbous portion 21 is formed in leg 14 in line with bore 16. This portion prevents the formation of a foam or the carrying of the droplets or pistons of reagent along with the gas to the measuring burette, and thus insures accurate measurements in a manner now to be described.

As heretofore stated, leg 14 leads to a pipette (not shown) containing an absorbing reagent. This reagent extends through bore 16 nearly up to its entry into barrel 11. Let us assume that it is desired to percolate a measured quantity of gas through the pipette in order to absorb an element or elements therefrom. The stop-cock 10 would then be turned until bore 18 assumes the position shown in dotted lines establishing communication between bore 15 leading to the measuring instrument and bore 16. To insure complete absorption of the element or elements by the reagent, the gas is percolated over the reagent a number of times by causing the gas to flow back and forth between the measuring burette and the pipette. This constant percolation causes a foam to form in bore 16 only, as the reagent is never permitted to flow past the point of entry of the bore into barrel 11.

Now if it is deemed that the element or elements is completely absorbed, the gas is run back into the measuring burette and the difference in reading indicates the amount of a certain constituent of the gas which has been absorbed. However, as some of the gas has caused the formation of droplets or pistons of reagent in the bore 16 due to constant percolation, it is apparent that the reading is not an accurate indication of the constituents absorbed. In my device, the formation of and the carrying over of the droplets into the measuring burette is eliminated as the bulbous portion 21 breaks up the gas enclosed droplets of reagent when it flows upwards into bore 16.

Figure 2:
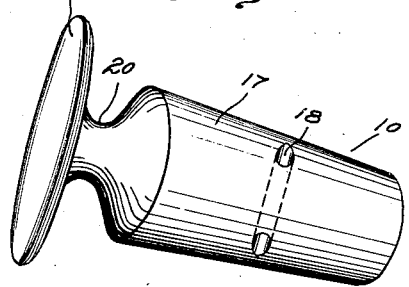
Fig. 2 is an enlarged perspective of the stop-cock embodying my invention.
Figure 3:
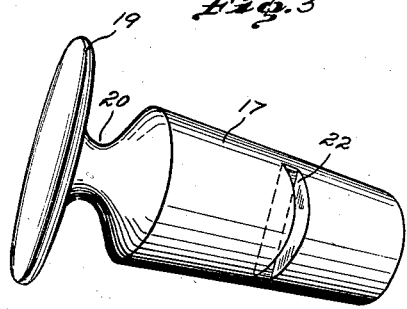
Fig. 3 is an enlarged perspective of a modification thereof.

Passageway 18 need not of necessity be in the form of a bore or hole as in Figs. 1 and 2, as the same results may be effected in the manner shown in Fig. 3. In this figure the handle, neck and stopper are the same as in Fig. 2, but in this instance a channel or passageway 22 is formed by cutting out a 120° segment from the stopper.

Figure 4:
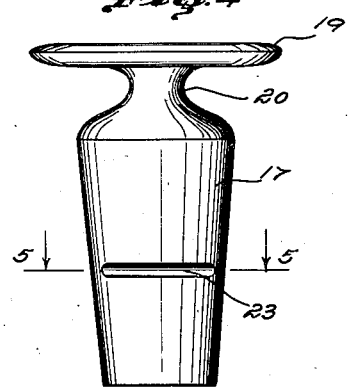
Fig. 4 is an elevation of a further modification.
Figure 5:
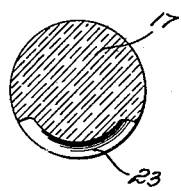
Fig. 5 is a section along the plane 5—5 of Fig. 4.

In Figs. 4 and 5 a further modification is shown. In this form, communication between the bores in the manifold can be established by passageway 23. Passageway 23 is formed in the stopper along an arc of 120°.

Figure 6:
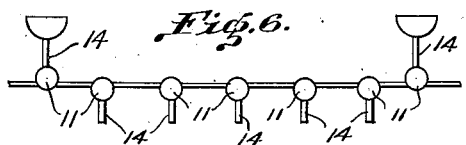
Fig. 6 is a diagrammatic view of a gas analysis manifold embodying my invention.

In Fig. 6, a diagrammatic representation of a complete manifold is shown. In effect, this manifold is formed of a plurality of T-shaped members such as is shown in Fig. 1, having the arms 12, 13 and consequently the bores 15, 15' in a horizontal, aligned position. In this manner a straight horizontal bore is provided which connects at one end to a measuring burette and at the other end to the mercury vessel. Thus, the mercury has always a uniform resistance to the gas, assuring accurate results, which is wholly due to the straight line horizontal bore that eliminates the formation of pockets. In addition, the manifold can be readily cleaned without necessitating the dismantling thereof, which was not possible in the devices of the prior art.

In all of the forms shown and described, communication between the arms of the manifold is established by a straight passageway which eliminates the formation of bends or pockets and lends itself conveniently for ready cleaning without necessitating the complete dismantling and regreasing of the stop-cocks of the apparatus.

In a gas analysis apparatus, the stop-cocks are usually formed of glass, but as this stop-cock has application to instruments other than gas analysis apparatus, it is readily apparent that it can be formed of any suitable material such as hard rubber, metal etc.

I claim:

1. A gas analysis manifold comprising a plurality of interconnecting T-joints, a three way stop-cock rotatable in a barrel connecting the arms or either arm and leg of each of the T-joints, said barrel being arranged in such a manner that the arms intersect the barrels at the ends of a chord of a 120° arc whereby a straight uninterrupted passageway between all of the arms may be had.

2. In combination with a valve comprising a barrel and a valve member rotatable in said barrel, a hollow extension leading into said barrel, said extension having a bulbous enlargement sufficiently spaced from said barrel whereby bubbles rising in said extension will be attenuated to the breaking point at a place remote from said barrel.

3. A three-way stop-cock including: a barrel having three arms extending from the barrel and in the same plane, forming a T, the two arms of the T forming a straight passageway that intersects the barrel at the ends of a 120° arc, and a stopper having a single, uninterrupted passageway, said passageway intercepting the periphery of the stopper at the ends of a 120° arc.

WLADIMIR M. ZAIKOWSKY.